United States Patent [19]

Perkins

[11] Patent Number: 4,473,817

[45] Date of Patent: Sep. 25, 1984

[54] COUPLING POWER LINE COMMUNICATIONS SIGNALS AROUND DISTRIBUTION TRANSFORMERS

[75] Inventor: William C. Perkins, Sachse, Tex.

[73] Assignee: Rockwell International Corporation, El Segundo, Calif.

[21] Appl. No.: 367,849

[22] Filed: Apr. 13, 1982

[51] Int. Cl.³ .............................................. H04M 11/04
[52] U.S. Cl. ................................ 340/310 R; 179/251; 307/3; 323/361
[58] Field of Search ........ 340/310 R, 310 A, 310 CP; 307/3, 140; 179/2.51, 170 H; 323/361

[56] References Cited

U.S. PATENT DOCUMENTS

| 1,865,952 | 7/1932 | Pfiffner | 179/2.51 |
| 1,888,555 | 11/1932 | Hund | 340/310 R |
| 2,113,708 | 4/1938 | Parrott | 340/310 R |
| 4,004,110 | 1/1977 | Whyte | 340/310 R |
| 4,057,793 | 11/1977 | Johnson | 340/310 R |

FOREIGN PATENT DOCUMENTS 1100068 3/1955 France .......................... 340/310 R
481533 11/1969 Switzerland ................... 340/310 R Primary Examiner—James J. Groody
Assistant Examiner—Michael F. Heim
Attorney, Agent, or Firm—V. Lawrence Sewell; Howard R. Greenberg; H. Fredrick Hamann

[57] ABSTRACT

A circuit is described for bi-directionally coupling a communication signal around a distribution transformer. The circuit includes a single-phase coupling transformer with a primary to secondary voltage ratio approximately equal to that of the distribution transformer. A capacitor is connected to one of the secondary terminals of the coupling transformer. The capacitor is chosen so that the series circuit including the capacitor, the self inductance of the coupling transformer and, possibly, the series inductance of interconnecting lines is resonant at the carrier frequency of the communications signal. The series combination of the capacitor and the secondary of the coupling transformer can be connected between two of the conductors on the secondary side of the distribution transformer which are selected for communication signal propagation.

7 Claims, 10 Drawing Figures

COUPLING POWER LINE COMMUNICATIONS SIGNALS AROUND DISTRIBUTION TRANSFORMERS

BACKGROUND OF THE INVENTION

This invention relates to a circuit providing coupling around an electric power utility distribution transformer in both directions for a power line communications signal.

Electric power utility distribution transformers exhibit a wide variety of configurations, such as, for example, phase-to-phase connected single phase transformer, delta/delta, open-delta/open-delta, delta/floating-wye and floating-wye/delta. Some of the distribution transformer configurations are either inefficient or totally ineffective in passing a power line communications signal from the primary to the secondary or vice versa. The present invention describes a circuit for effectively coupling a communications signal in both directions around a distribution transformer. The circuit of the invention has a number of advantages, including its ability to be used with a very wide variety of distribution transformer configurations.

One of the principal advantages of the present invention relates to the fact that prior art circuits generally include a capacitor which must have a voltage rating at the level of the primary voltage of the distribution transformer. By contrast, the present invention teaches the use of a relatively small capacitor rated at the secondary voltage of the distribution transformer.

An additional advantage of the present invention is that means are afforded to provide a signal voltage transformation ratio approximately equal to the power voltage ratio of the bypassed transformer. Thus the signal level at the secondary is in the same level range as if it had passed through the bypassed transformer.

SUMMARY OF THE INVENTION

In accordance with the present invention, there is provided a circuit for bi-directionally coupling a communications signal with a carrier frequency around a distribution transformer having a primary to secondary voltage ratio R. The distribution transformer has multiple conductors associated with the primary side and the secondary side, including possible neutrals and grounds. The circuit of the invention includes a single phase coupling transformer with a primary-to-secondary voltage ratio approximately equal to R. A capacitor is connected to one of the secondary terminals of the coupling transformer. The capacitor is chosen so that the series circuit including the capacitor, the self inductance of the coupling transformer and, possibly, the series inductance of interconnecting lines is resonant at the carrier frequency of the communications signal. The primary terminals of the coupling transformer can be connected to two of the conductors on the primary side of the distribution transformer which are selected for communications signal propagation. The series combination of the capacitor and the secondary of the coupling transformer is connected between two of the conductors on the secondary side of the distribution transformer which are selected for communication signal propagation.

The coupling transformer provides isolation between the primary and secondary connections. Establishing the voltage ratio of the coupling transformer to be the same as that of the distribution transformer provides optimum transparency to the communications signal in both directions through the coupling circuit. The resonance condition provided by the capacitor serves to reduce the coupling impedance and to maximize signal level transmitted through the circuit.

The capacitor blocks the power frequency fundamental and lower harmonics from passing through the coupling circuit. Since it is isolated from the primary side of the distribution transformer, it need be rated only at the secondary voltage rating of that transformer.

It is an advantage of the present invention that it is fabricated exclusively of passive components. The design is such that it finds particular applicability to the advantageous power line communications carrier range of 3-10 KHz.

DESCRIPTION OF PREFERRED EMBODIMENTS

Figure 1:
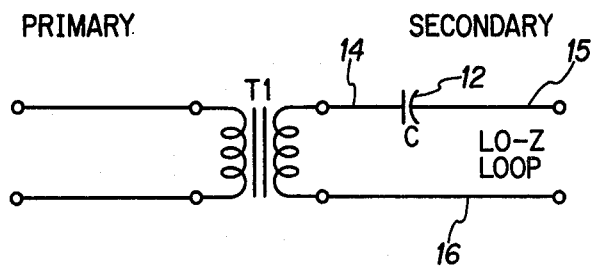
FIG. 1 is a schematic diagram of a coupling circuit according to the invention, shown unconnected to a distribution transformer.

FIG. 1 shows the basic coupling circuit according to the invention, including a single phase coupling transformer T1, with a capacitor 12 having capacitance C connected to one terminal of the coupling transformer secondary. The transformer provides isolation between the primary and secondary connections of the distribution transformer which is being bypassed. Further, the primary-to-secondary voltage ratio of the coupling transformer T1 is preferably set equal to the primary-tosecondary voltage ratio R of the distribution transformer, so that the coupling circuit will exhibit optimum transparency to the communications signal in both directions.

The capacitor 12 blocks the power frequency fundamental and its lower harmonics from being transferred through the coupling transformer T1. The capacitance C is selected to be series resonant at the power line communications signal carrier frequency $f_c$ with the self inductance $L_{T1S}$ of transformer T1, referred to the transformer T1 secondary. The self inductance $L_{T1S}$ is that measured at the frequency $f_c$, seen looking into the secondary of transformer T1 with its primary shorted. This resonance provides a low signal coupling impedance at the frequency $f_c$ and maximizes the communication signal level in both directions of transmission. The impedance on the primary side of transformer T1 is higher than that on the secondary by a factor equal to the square of the voltage ratio of transformer T1.

The conductors 14–16 in FIG. 1, which interconnect the secondary of transformer T1 with capacitor 12 and connection points in the secondary circuit of the distribution transformer can contribute their own inductance. When these conductors are long, for example, more than 50 feet, their series inductance $L_L$ can be appreciable. When this is taken into account, the resonance condition is expressed:

$$(2\pi f c)^2 = 1/(L_{T1S} + L_L)C.$$

For minimum coupling losses, $L_L$ should be minimized; therefore, the length and impedance of the interconnecting lines 14–16 should be minimized. This is manageable if the interconnecting lines are very short, for example, less than 10 feet long. Another method of minimizing the impedance is to construct the interconnecting lines of triplex or a similar close-spaced conductor configuration well known in power utility practice. The interconnecting links can utilize the two insulated conductors of the triplex, while the bare messenger conductor can be employed for incidental grounding purposes.

Thus, ordinarily $L_L$ can be neglected, resulting in the resonance equation:

$$(2\pi f c)^2 = 1/L_{T1S}C.$$

Under this condition, the capacitance C can be determined prior to field installation, and once installed, remains independent of changes in the power circuit, including changes in power load. The primary voltage rating of transformer T1 should be equal to or somewhat higher than the power voltage across which it is connected. The secondary voltage rating of transformer T1 should be approximately equal to the power voltage across which the series combination of the transformer T1 secondary and the capacitor 12 is connected.

For higher secondary voltages, such as 277 volts RMS or 480 volts RMS, a secondary voltage rating for transformer T1 of 240 volts RMS will ordinarily still be acceptable. This is because the impedance of the secondary of the bypassed distribution transformer rises with the square of its voltage ratio, an especially significant factor at the carrier frequency $f_c$ that tends to offset the disadvantage of different voltage ratios between the bypassed distribution transformer and the coupling transformer T1. Thus, less costly and more prevalently available transformers, such as those with 120-volt or 240-volt secondaries, can be used for coupling to most standard secondary customer utilization voltage services.

Capacitor 12 can be a relatively small capacitor, with a voltage rating corresponding to that of the coupling transformer T1 secondary. The life expectancy of capacitor 12 will be extended, if the voltage ratios and phasing of the coupling transformer T1 are coordinated with those of the bypassed distribution transformer so that the normal steady state power frequency voltage across capacitor 12 is minimized. For some configurations, this will also enhance the efficiency of the coupling. Nevertheless, the voltage rating of capacitor 12 should be sufficient to withstand temporary or inadvertent conditions of loss of excitation or single phasing on either coupling or distribution transformer, or both with worst case additive voltages.

The power rating of transformer T1, and therefore also its physical size, weight and cost can be relatively low, even when coupling around much larger power distribution transformers. For example, the KVA rating of the coupling transformer can be on the order of a few percent of that of the distribution transformer. This advantage is conditioned on guarding against the use of a coupling transformer that is so small that the parallel self-resonant frequency of the primary winding falls below a frequency approximately equal to the second harmonic of the carrier frequency $f_c$. For example, the use of some low-burden primary metering potential transformers for transformer T1 can risk this condition, which inserts the lossy high impedance near primary parallel self-resonance in series with the communications signal coupling path.

It should be noted that an existing single-phase transformer with compatible primary and secondary connections and voltage ratings, which is installed near the distribution transformer to be bypassed, can be used as coupling transformer T1, thus saving the cost of a transformer dedicated to signaling.

The self inductance of the relatively small coupling transformer T1 provides sufficient isolation from transients that might otherwise pass through transformer T1 and capacitor 12. However, power utility policy and standard practices may require protection for the capacitor. Such protection can be provided by a single metal oxide varistor (MOV) across the capacitor 12. The characteristics of the MOV should be coordinated to tolerate worst-case loss of excitation and/or single-phasing conditions as well as any normal steady-state power frequency voltage across the capacitor. A variety of alternative protection devices are known in the art as well.

FIGS. 2–10 show examples of coupling configurations using the circuit of the invention of FIG. 1 to couple power line communication signals around various distribution transformer arrangements that would otherwise block or significantly impede the signals. In each case, the primary of the transformer T1 is connected across two of the conductors on the primary side of the distribution transformer which are most favored with respect to communication signal strength. Also in each case, the series combination of the transformer T1 secondary and the capacitor 12 is connected across secondary conductors selected for connection of a communications signal transponder, receiver or transmitter.

Figure 2:
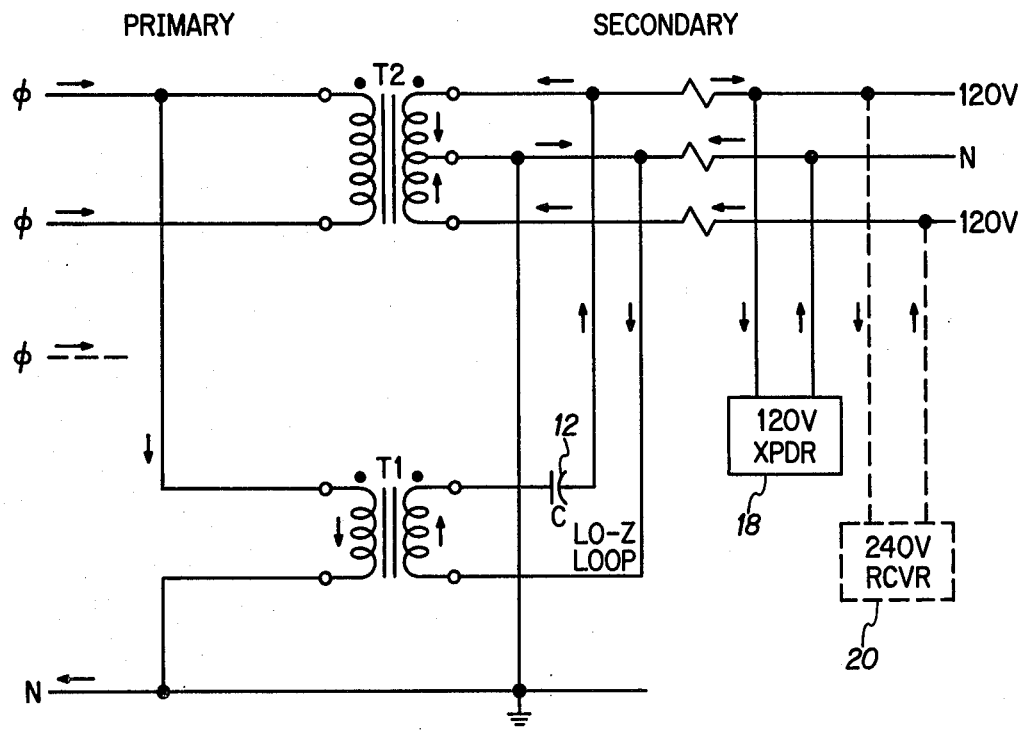
FIG. 2 is a schematic diagram of a circuit according to the invention coupling a balanced phase to neutral communication signal around a primary phase to phase connected single-phase transformer.

FIG. 2 shows an application of the coupling circuit of FIG. 1 in which coupling of phase-to-neutral power line communications signals, equal in amplitude and phase among the primary power phase conductors, is provided around a single-phase distribution transformer T2, the primary of which is connected phase-to-phase. Without the coupling circuit, very little signal energy would pass through the distribution transformer T2, except for relatively unpredictable unbalanced leakage signals. Conventional phasing symbols are shown, and communication signal current flow is shown by arrows. Arrows on each phase $\phi$ and the neutral conductor N of the primary distribution circuit depict signal current flow to other points on that circuit in addition to the customer location served by the coupling circuit.

As can be seen from FIG. 2, the primary of transformer T1 is connected between neutral and one phase on the primary distribution feeder or branch thereof serving distribution transformer T2. The secondary terminals of the coupling circuit, formed by one terminal each of capacitor 12 and of transformer T1, are connected across two of the conductors at the secondary of the distribution transformer T2. These two conductors from the transformer T2 secondary have across them a 120-volt transponder 18.

Alternatively, or additively, connections can be made to 240-volt receiver 20 connected as shown across the entire secondary of transformer T2. Signal current flow arrows show how autotransformer action in the secondary of transformer T2 causes the desired signal to appear at a receiver connected in this manner, even though the secondary of the coupling circuit of the invention is connected only across a portion of the distribution transformer secondary.

Figure 4:
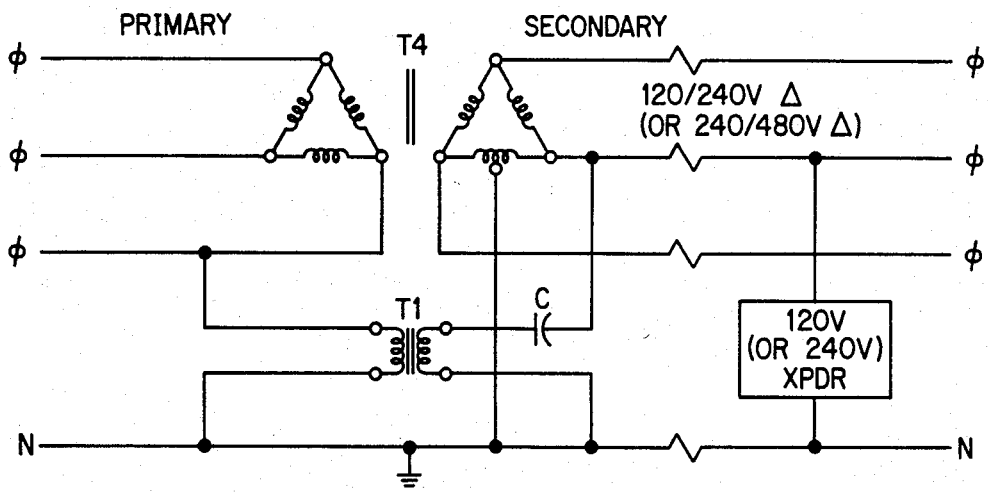
FIG. 4 is a schematic diagram of a circuit according to the invention coupling a communications signal around a delta-to-delta one and three-phase transformer bank.
Figure 6:
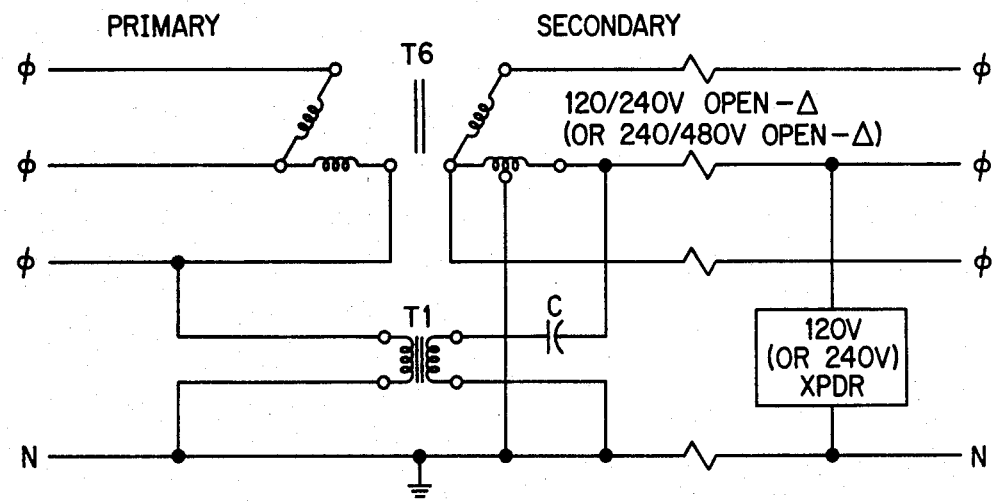
FIG. 6 is a schematic diagram of a circuit according to the invention coupling a communications signal around an open delta to open delta one and three-phase transformer bank.
Figure 10:
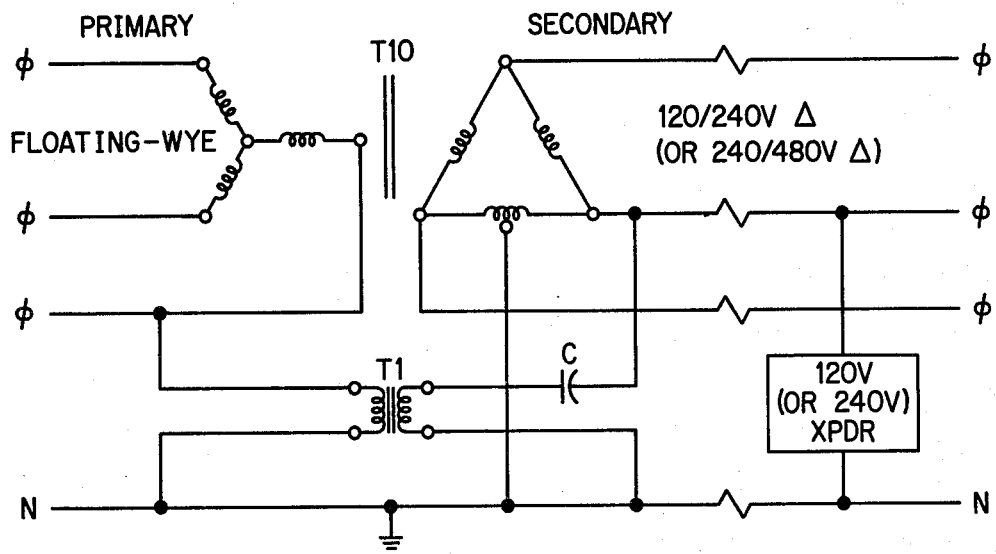
FIG. 10 is a schematic diagram of a circuit according to the invention coupling a communications signal around a floating-wye-to-delta one and three-phase transformer bank.

Conversely, the secondary terminals of the coupling circuit can be connected across the entire secondary winding of the bypassed distribution transformer and, by autotransformer action in this tapped winding, communications are implemented with devices connected between any two of the three conductors connected to this winding. Specifically, in FIG. 2, if the secondary terminals of the coupling circuit were connected between the two 120-volt conductors (having power voltages of opposite polarity), then pairs of conductors selected for communication signal propagation could include, either 120-volt conductor with neutral or both 120-volt conductors. In the circuits of FIGS. 4, 6 and 10, also including center tapped secondary windings in the bypassed transformers, the same choices are available.

In the circuits of FIGS. 2-10, some communication signal current from the secondary of transformer T1 flows backwards into the secondary of the distribution transformer but does not appreciably affect the desired operation, because the series inductive reactance of the distribution transformer is high at the carrier frequency $f_c$ and the distribution transformer has no series resonating capacitance like capacitor 12 associated with transformer T1. Therefore, the coupling function of the circuit including transformer T1 and capacitor 12 overcomes the loading effects of the distribution transformer on the desired signal, even when transformer T1 is physically much smaller than the bypassed distribution transformer.

Figure 3:
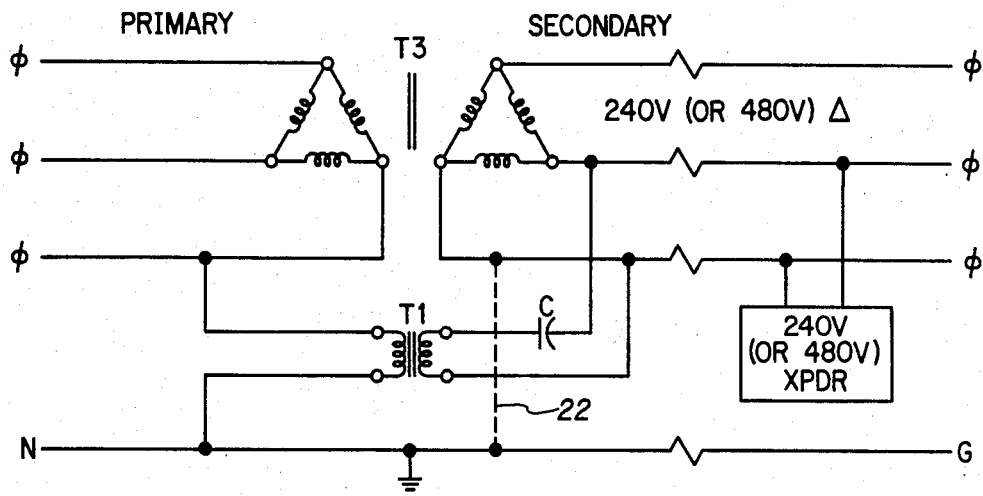
FIG. 3 is a schematic diagram of a circuit according to the invention coupling a communication signal around a delta-to-delta three-phase transformer bank.

FIG. 3 illustrates how a circuit according to the invention can couple a communication signal around a delta-to-delta three-phase transformer T3. On the primary side, the communication signal is phase-to-neutral, while on the secondary side it is phase-to-phase. The ground symbol G is shown in this and others of the FIGS. 3-10 where a ground conductor sometimes accompanies a floating secondary or corner grounded delta secondary. The broken line 22 in FIG. 3 represents an optional corner ground.

FIG. 4 illustrates how a circuit in accordance with the invention can couple around a delta-to-delta one and three-phase transformer T4. In this case, the communications signal is phase-to-neutral on both sides of the transformers.

Figure 5:
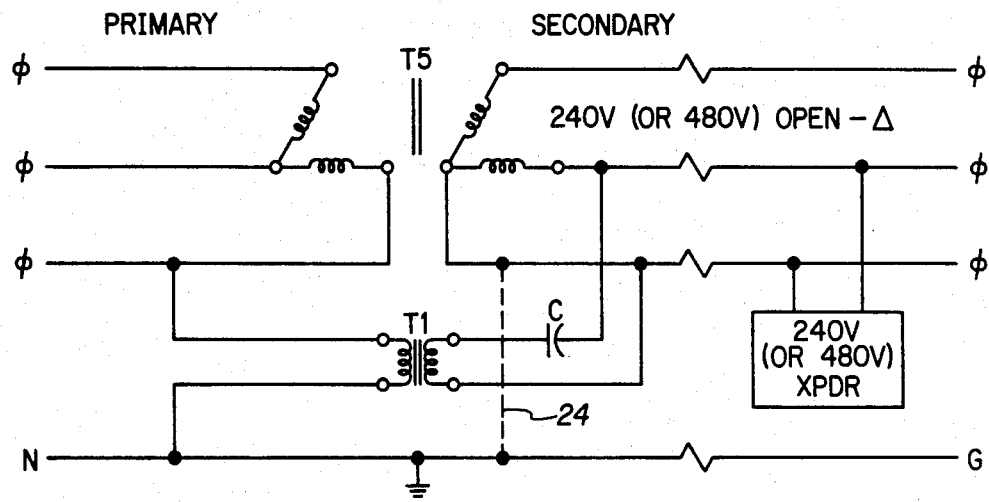
FIG. 5 is a schematic diagram of a circuit according to the invention coupling a communications signal around an open-delta-to-open-delta three-phase transformer bank.

FIG. 5 illustrates how a coupling circuit in accordance with the invention couples around an open-delta-to-open-delta three-phase distribution transformer T5. The primary communication signal is phase-to-neutral while the secondary is phase-to-phase. Broken line 24 represents an optional corner ground.

In FIG. 6, the circuit of the invention couples around an open-delta-to-open-delta one and three-phase transformer T6. On both the primary and secondary sides, the communications signal mode is phase-to-neutral.

Figure 7:
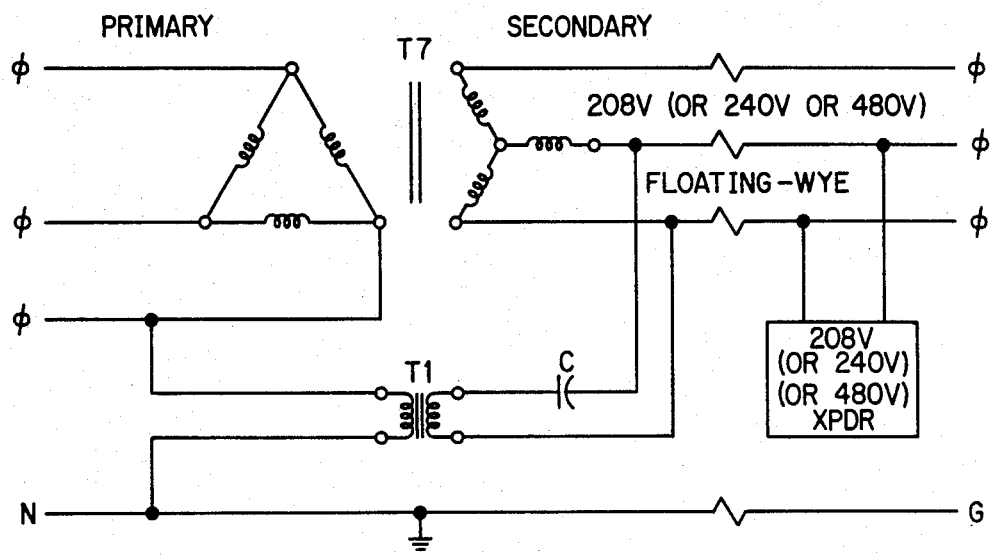
FIG. 7 is a schematic diagram of a circuit according to the invention coupling a communications signal around a delta-to-floating-wye three-phase transformer bank.

In FIG. 7, the coupling circuit bypasses a delta-to-floating-wye three-phase transformer T7. The communication signal on the primary side is phase-to-neutral, and on the secondary side is phase-to-phase.

Figure 8:
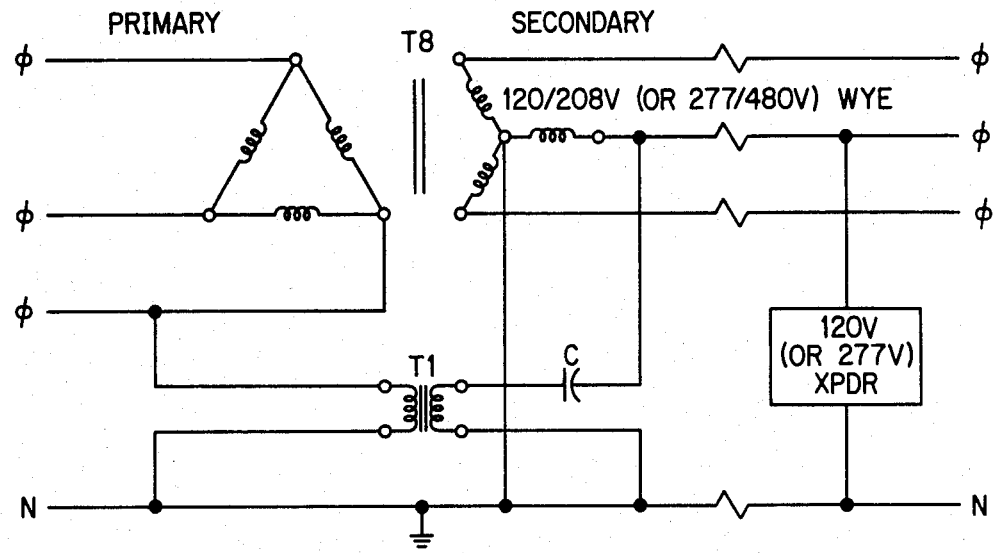
FIG. 8 is a schematic diagram of a circuit according to the invention coupling a communications signal around a delta-to-wye-grounded three-phase transformer bank.

In FIG. 8, the circuit is used to couple around a delta-to-wye-grounded three-phase transformer T8. The communications signal is phase-to-neutral on both sides of the transformers.

Figure 9:
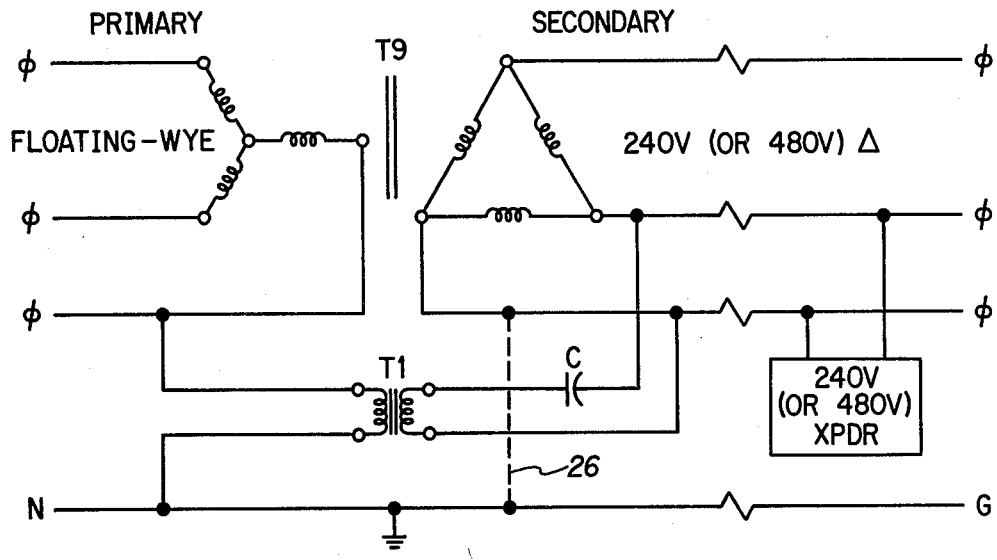
FIG. 9 is a schematic diagram of a circuit according to the invention coupling a communications signal around a floating-wye-to-delta three-phase transformer bank.

In FIG. 9, the coupling circuit of the invention is used to bypass a floating-wye-to-delta three-phase transformer T9. A phase-to-neutral communication signal on the primary side is coupled to a phase-to-phase mode on the secondary side. Broken line 26 represents an optional corner ground.

FIG. 10 shows the circuit of the invention coupling around a floating-wye-to-delta one and three-phase transformer T10. The communications signal is phase-to-neutral on both sides of the transformers.

It is important to remember with regard to the above schematic diagrams that they are simplified in that they do not show typical disconnect and protection components to be applied by the utility using the coupling circuit.

Having considered the coupling circuit of the invention in detail, along with many applications, it is apparent that the circuit provides a number of advantages. The circuit uses only passive components. A relatively small standard distribution transformer or control transformer can be used as coupling transformer T1 in the coupling circuit. The only other component of the coupling circuit functional to power line communication signaling is a single, relatively small capacitor. With properly chosen interconnection, the capacitance of the resonating capacitor can be determined prior to field installation. The capacitor need be rated only at the secondary voltage, not at the primary voltage. The primary and secondary circuits are fully isolated by the transformer and the capacitor at the power frequencies. The voltage ratios for the power frequency and the communications signal carrier frequency are preferably matched, although an exact match is not essential. The coupling circuit of the invention can be used to deal with the wide variety of distribution transformer configurations, which are incompatible or suboptimal for power line communications signaling modes.

I claim:

1. A circuit for bi-directionally coupling a communications signal with carrier frequency $f_c$ around a distribution transformer having a primary-to-secondary voltage ratio R, and having associated with the primary side thereof a plurality of conductors which can include a neutral, and associated with the secondary side thereof a plurality of conductors which can include a neutral or a ground, with two of the conductors on the primary side and two of the conductors on the secondary side being selected for communication of said signal, said circuit comprising:
- a single phase coupling transformer with a primary-to-secondary voltage ratio approximately equal to R, and having the primary terminals thereof each connected to a different one of said two conductors on the primary side of the distribution transformer, and one of the secondary terminals of the coupling transformer connected to one of said two conductors on the secondary side of the distribution transformer; and
- a capacitor connected from the other secondary terminal of the coupling transformer to the other of said two conductors on the secondary side of the distribution transformer, said capacitor being selected so that the series circuit including the capacitor and the self-inductance of the coupling transformer is resonant at said carrier frequency.

2. The circuit of claim 1, wherein said series resonant circuit includes interconnecting lines having significant series inductance.

3. The circuit of claim 1, wherein said capacitor has a voltage rating corresponding to the nominal power voltage of said two conductors on the secondary side of the distribution transformer.

4. The circuit of claim 1, wherein one of said two conductors on the primary side of the distribution transformer carries one phase of a three phase line, and the other of said two conductors on the primary side is a neutral.

5. The circuit of claim 4, wherein the secondary of said distribution transformer has three phases and said two conductors on the secondary side of the distribution transformer are two of the secondary three phases.

6. The circuit of claim 4, wherein the secondary of said distribution transformer has three phases, and one of the two conductors on the secondary side of the distribution transformer is one of the three phases of said secondary and the other of said two conductors on the secondary side is a neutral.

7. A circuit for bi-directionally coupling a communications signal with carrier frequency $f_c$ around a distribution transformer having a primary-to-secondary voltage ratio R, and having associated with the primary side thereof a plurality of conductors which can include a neutral, and associated with the secondary side thereof a plurality of conductors which can include a neutral or a ground, with two of the conductors on the primary side and two of the conductors on the secondary side being selected for communication of said signal, the secondary of the transformer including a winding with three terminals, two of said terminals providing voltages of opposite polarity with respect to the third terminal, and said two selected conductors on the secondary side being connected to a pair of said three terminals, said circuit comprising:
- a single phase coupling transformer with a primary-to-secondary voltage ratio approximately equal to R, and having the primary terminals thereof each connected to a different one of said two selected conductors on the primary side of the distribution transformer, and one of the secondary terminals of the coupling transformer forming a secondary terminal of said coupling circuit;
- a capacitor, having one side connected to the other secondary terminal of the coupling transformer, and the other side forming another secondary terminal of said coupling circuit, said capacitor being selected so that the series circuit including the capacitor and the self-inductance of the coupling transformer is resonant at said carrier frequency; and
- said secondary terminals of the coupling circuit being connected to the conductors connected to any two of said three distribution transformer winding terminals.

* * * * *